United States Patent
Keller

(10) Patent No.: US 6,905,323 B2
(45) Date of Patent: Jun. 14, 2005

(54) DEVICE FOR PRODUCING TWO-CHAMBER CONTAINERS

(75) Inventor: Gerhard Keller, Jongny (CH)

(73) Assignee: AISA Automation Industrielle SA, Vouvry (CH)

(*) Notice: Subject to any disclaimer, the term of this patent is extended or adjusted under 35 U.S.C. 154(b) by 106 days.

(21) Appl. No.: 10/149,369
(22) PCT Filed: Dec. 5, 2000
(86) PCT No.: PCT/EP00/12214
§ 371 (c)(1), (2), (4) Date: Oct. 25, 2002
(87) PCT Pub. No.: WO01/42091
PCT Pub. Date: Jun. 14, 2001

(65) Prior Publication Data
US 2003/0222099 A1 Dec. 4, 2003

(30) Foreign Application Priority Data
Dec. 7, 1999 (DE) .......................... 199 58 920

(51) Int. Cl.⁷ .................. B29C 43/18; B29C 65/74; B29C 69/00; B29C 70/84
(52) U.S. Cl. .................. 425/112; 156/218; 156/251; 156/461; 156/515; 264/262; 425/123; 425/126.1
(58) Field of Search ............... 425/112, 123, 425/126.1; 264/261, 262; 156/218, 251, 461, 515

(56) References Cited

U.S. PATENT DOCUMENTS 2,661,870 A   12/1953   Huenergardt ............... 220/129
3,157,096 A * 11/1964   Schmidt ..................... 156/218
3,260,777 A *  7/1966   Brandt ........................ 264/262
3,991,294 A * 11/1976   Evans ......................... 219/633
4,267,005 A *  5/1981   Barnaby ...................... 156/515
4,285,750 A *  8/1981   DeMartino ................... 156/218
4,630,429 A * 12/1986   Christine .................... 156/515
4,757,668 A    7/1988   Klinkel et al. ............... 53/451
5,211,798 A *  5/1993   Keller ...................... 425/126.1
5,219,373 A    6/1993   Hatakeyama et al. ......... 425/123
5,954,231 A    9/1999   Durliat et al. .............. 264/512
6,210,621 B1 * 4/2001   Usen et al. .................. 264/263
6,227,837 B1 * 5/2001   Keller et al. ................ 425/112
6,551,543 B1 * 4/2003   Keller et al. ................ 425/123

FOREIGN PATENT DOCUMENTS

| DE | 19 10 032  | 9/1970 |
| EP | 0 905 049  | 3/1999 |
| FR | 1 209 359  | 3/1960 |
| FR | 2 623 170  | 5/1989 |
| WO | WO 97/18138 | 5/1997 |

* cited by examiner

Primary Examiner—Robert B. Davis
(74) Attorney, Agent, or Firm—Collard & Roe, P.C.

(57) ABSTRACT

The invention relates to a two-chamber container, in particular as a non-resealable disposable packaging, wherein the two-chamber container has an inner chamber (1) and an outer chamber (2) surrounding the inner chamber (1), and a cap (3) produced by compression of plastics material, with which the upper edges of the wall of the inner chamber (1) and those of the outer chamber (2) are rigidly connected, the cap (3) having two separate channels ($7_1$, $7_2$), and the inner chamber (1) being arranged asymmetrically inside the outer chamber (2) in such a way that a portion of its wall is secured to the cap (3) in the region between the channels ($7_1$, $7_2$) in such a way that one channel ($7_1$, $7_2$) is connected to one of the chambers (1 or 2) in each case.

2 Claims, 5 Drawing Sheets

DEVICE FOR PRODUCING TWO-CHAMBER CONTAINERS

CROSS REFERENCE TO RELATED APPLICATIONS

Applicant claims priority under 35 U.S.C. §119 of German Application No. 199 58 920.8, filed on Dec. 7, 1999. Applicant also claims priority under 35 U.S.C. §365 of PCT/EP00/12214, filed on Dec. 5, 2000. The international application under PCT article 21(2) was not published in English.

BACKGROUND OF THE INVENTION

1. Field of the Invention

The invention relates to a device for producing two-chamber containers, with an inner mandrel and an outer mandrel, wherein the inner mandrel can be inserted into and withdrawn from the outer mandrel, a die cavity for a cap and a material feeder for supplying a heated portion of a thermoplastic polymer material into the die cavity of a compression mould.

2. The Prior Art

A device of this type is known from U.S. Pat. No. 5,219,373. Here, two separately produced one-piece tubes with different diameters are pushed onto their corresponding inner or outer mandrel respectively, so a cap with common outlet aperture is provided by means of injection moulding owing to a nozzle piece and is simultaneously connected to both tube ends. This method is time-consuming as a result of the many individual steps and, therefore, does not allow a high number of pieces to be produced per unit of time, in particular as the tubes are initially produced individually and have to be introduced into the device in a coordinated manner.

SUMMARY OF THE INVENTION

The object of the invention is to provide a device for producing two-chamber containers, in particular as non-resealable disposable packaging, which looks nice and can be produced simply and quickly.

This object is achieved by a device for producing two-chamber containers, with an inner mandrel and an outer mandrel, wherein the inner mandrel can be inserted into and withdrawn from the outer mandrel, a die cavity for the cap and a material feeder for supplying a heated portion of a thermoplastic polymer material into the die cavity of a compression mould. There is a device for winding a film around the driven-out inner mandrel and a device for winding a film around the outer mandrel and advanceable welding devices to produce longitudinal side seams to produce tubes. The mandrels can both be inserted into and withdrawn from the die cavity of the compression mould to produce a cap with a seal and for connection to the walls of the chambers formed. Each mandrel has a projection in the direction fo the die cavity for forming a channel in the cap connected to a chamber in each case.

In a preferred embodiment, the advanceable welding device has two opposing and pivotable welding jaws which have two jaw projections separated by a gap in each case, wherein a cutting device can be inserted into and withdrawn from the common gap.

BRIEF DESCRIPTION OF THE DRAWINGS

The invention will be described in more detail below with the aid of an embodiment of a device for producing two-chamber containers.

In the drawing.

DETAILED DESCRIPTION OF THE PREFERRED EMBODIMENT

Figure 1:
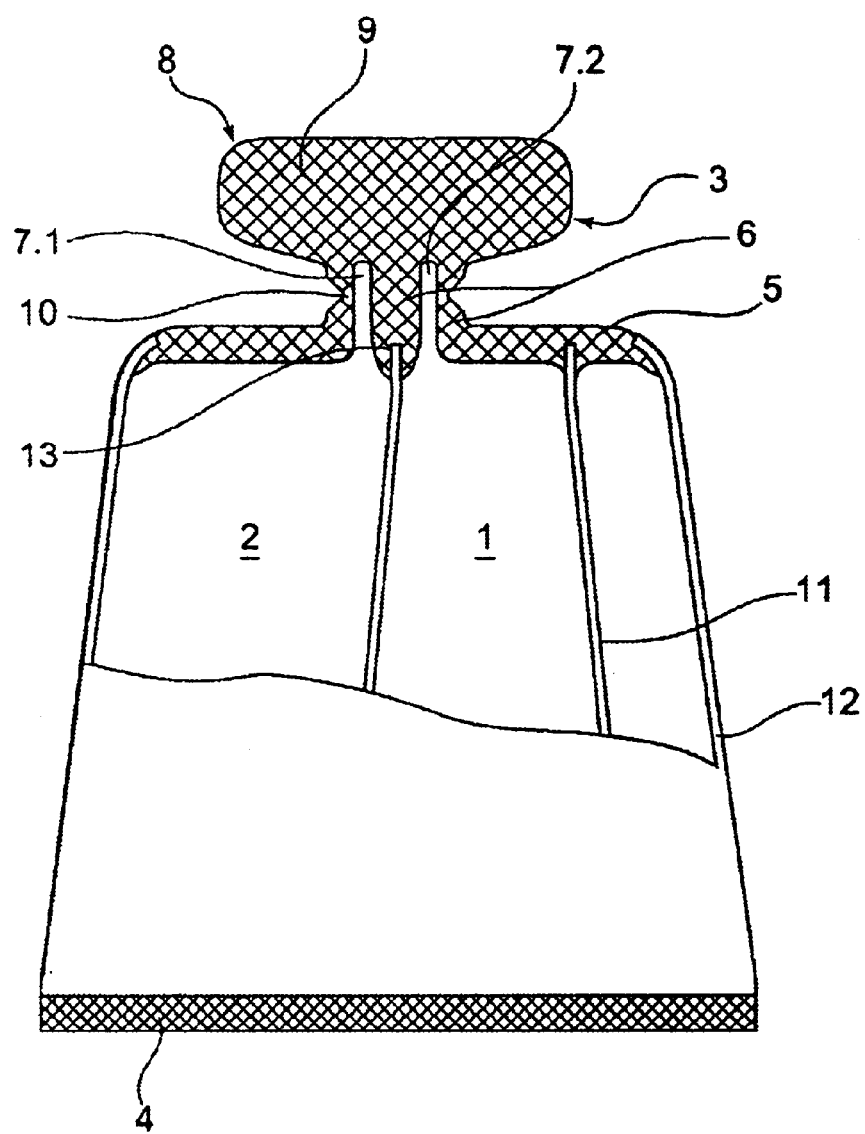
FIG. 1 shows a two-chamber container in side view.

The two-chamber container illustrated in FIG. 1 in the form of a disposable packaging for two components which are to be stored separately from one another but are to be used together, has an inner chamber 1 and an outer chamber 2 surrounding it, a cap 3 and a fastening seam 4 produced only after filling of the chambers 1 and 2 with different filling components, which fastening seam seals the chambers 1, 2 at the end remote from the cap 3 while separating them from one another.

Figure 2:
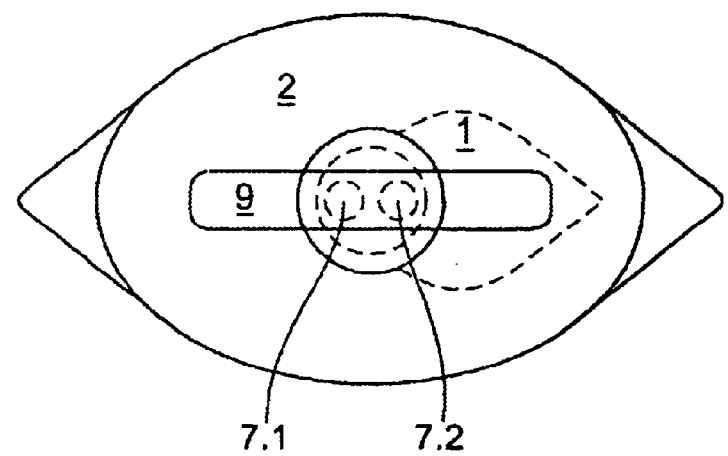
FIG. 2 shows the two-chamber container illustrated in FIG. 1 in plan view from above.

The cap 3 has a shoulder 5 which, according to FIG. 2, has a laterally flattened, rounded cross-section which can also be rounded so as to be circular or oval. The cap 3 also has a—in this case central—neck 6 in which two channels $7.sub.1$, $7.sub.2$ are formed, of which one in each case is connected to one of the chambers 1 or 2. A seal 8 is attached to the neck 6, which seal is designed in the embodiment as a twist-off seal 9. There is a predetermined breaking point 10 on part or all of the periphery of the neck 6 in order to facilitate twisting off. The twist-off seal 9 is preferably designed in such a way that when it is broken and the openings of the channels $7.sub.1$, $7.sub.2$ are thus exposed it remains connected to the cap 3, in other words, it does not have to be disposed of separately.

The chamber 1 is produced from a tubular film 11 with smaller diameter and the outer surrounding chamber 2 from a tubular film 12 with larger diameter. As shown clearly in FIGS. 1 and 2, the tubular film 11 is secured by a portion of its wall to the insert 13 arranged centrally in this case, in which the channels $7.sub.1$, $7.sub.2$ are formed, so as to separate them from one another in such a way that each chamber 1, 2 is connected to only one channel $7.sub.1$ or $7.sub.2$.

Figure 3:
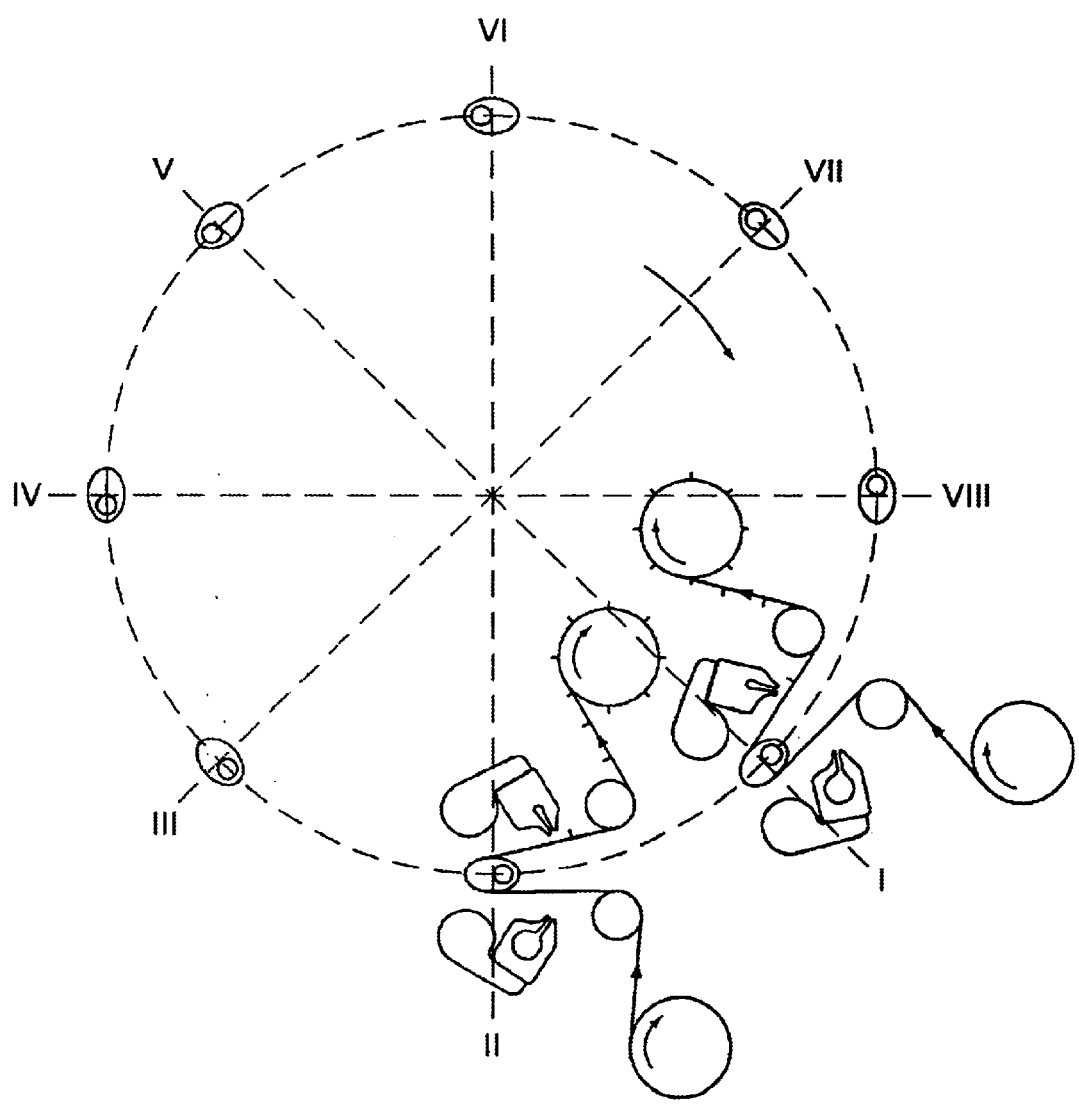
FIG. 3 shows a device for producing the two-chamber container in schematic view.

The workstations for producing a two-chamber container, as is described above for example, can be seen in FIG. 3. In position I a film is wound round an inner mandrel and the film is welded to form a tube to produce the inner chamber 1. At station II a film is wound round an outer mandrel and welded to form a tube by the production of a side weld seam to produce the outer chamber 2. The inner tubular film can also be produced at station II and the outer tubular film at station I. This can optionally also take place at different heights, wherein both tubes must at least be transported into one plane. A portion of material, for example plastics material plasticised by heat, is supplied to a die cavity at station III. At station IV the inner mandrel and the outer mandrel are introduced, together with the inner and outer tube produced, into a die cavity where the cap is formed from the portion of material and is simultaneously connected to the two tube ends located in approximately one plane. Some or all of stations V to VII can be provided as cooling stations for curing and cooling of the cap. At station VIII the die is opened and the finished product removed and transported away. The described allocation of the production stages to the stations is to be considered as an example. Any other allocation of the processing stages is also possible.

Figure 4A:
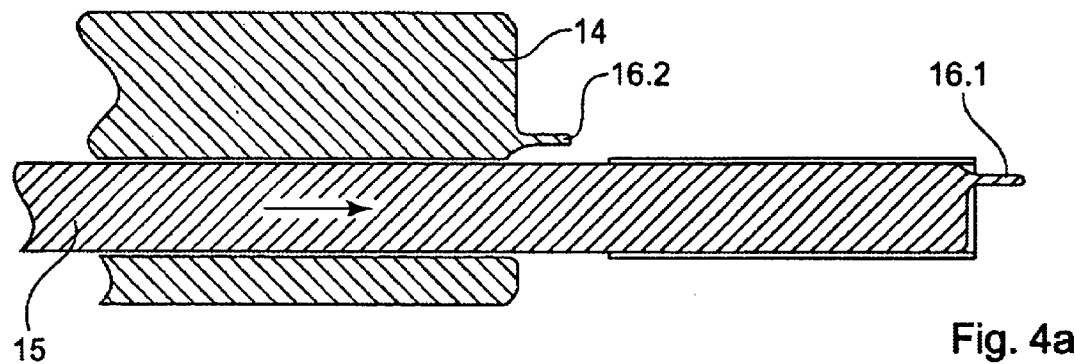
FIGS. 4*a, b, c* shows a mandrel system and its interaction with a pressing tool.
Figure 4B:
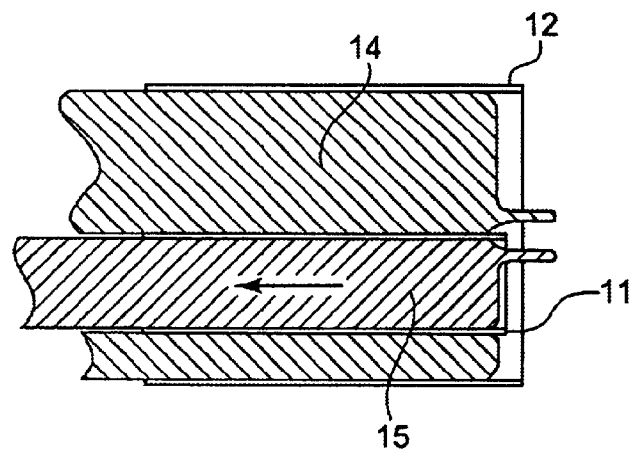
Figure 4C:
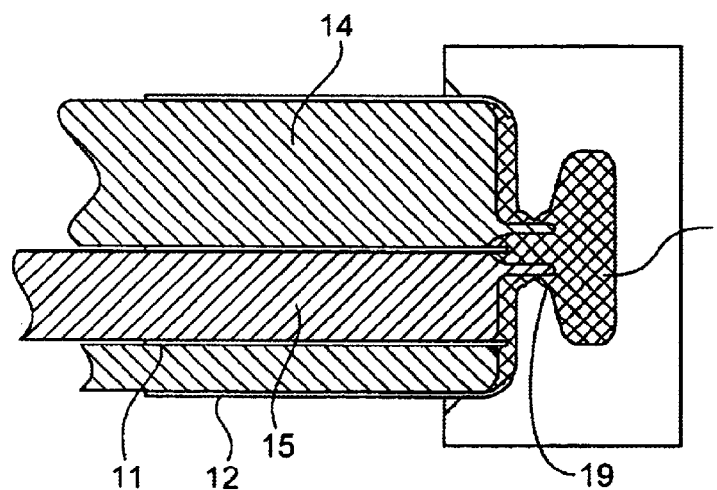
Figure 5:
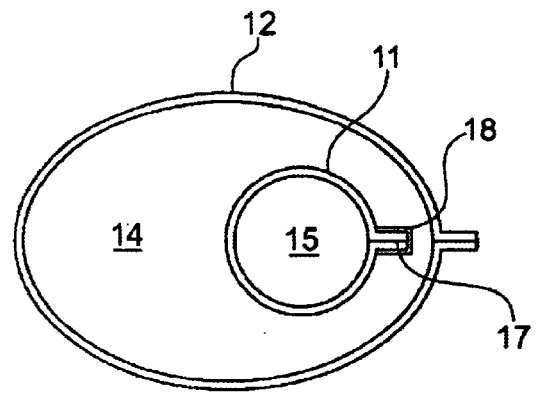
FIG. 5 shows a view from above onto the mandrel system with tubes.

FIG. 4 shows an outer mandrel 14 in which an inner mandrel 15 is arranged so it can be inserted and withdrawn. The outer die of the outer mandrel 14 corresponds to the inner die of the outer chamber 2 and that of the inner mandrel 15 to that of the inner chamber 1 (see FIG. 5 also). The inner mandrel 15 and the outer mandrel 14 have cylindrical mandrel projections $16.\text{sub}.1$, $16.\text{sub}.2$ which are provided in the cap 3 to be attached to form the channels $7.\text{sub}.1$, $7.\text{sub}.2$ (see FIG. 1). When the inner mandrel 15 has been driven in the direction of the arrow in FIG. 4a out of the outer mandrel 14 into its external end position, a strip of film or a portion thereof is wound round the driven-out inner mandrel 15 to form a tube which is sealed by a side seam 17, preferably by welding. The side seam 17 can be produced as an overlapping seam or—as illustrated—as a parallel seam, wherein the start and the end of the film winding round the mandrel are aligned parallel to one another and then welded to one another for example by means of supplied welding tongs. With such an embodiment of the side seam 17 with parallel edges, the outer mandrel has a recess 18 which serves to receive the side seam 17 projecting somewhat radially when the inner mandrel 15 is retracted into the outer mandrel 14 (see FIG. 4b).

In the position shown in FIG. 4b, both the inner mandrel 15 and the outer mandrel 14 provided with a side seam carry tubular films 11, 12 which project slightly beyond the free ends of the respective mandrels 14 and 15. The mandrels 14, 15 equipped with tubular films 11, 12 in this way are simultaneously fed with their free ends into a die cavity 19 which reproduces the external form of a cap 3 with seal 8 which is to be moulded on. A portion of plasticised material, from which the cap 3 is to be produced, has previously been fed into the die cavity 19. Owing to a movement of the mandrels 14, 15 into the die cavity 19 or of the die cavity 19 towards the mandrels 14, 15 or a common movement of mandrels 14, 15 and die cavity 19 towards one another, the cap 3 is moulded on by compression of the portion of material. In the process, the channel $7.\text{sub}.1$ associated with the inner chamber 1 is formed by means of the projecting mandrel projection $16.\text{sub}.1$ and accordingly the channel $7.\text{sub}.2$ of the outer chamber 2 is formed by the mandrel projection $16.\text{sub}.2$.

Figure 6:
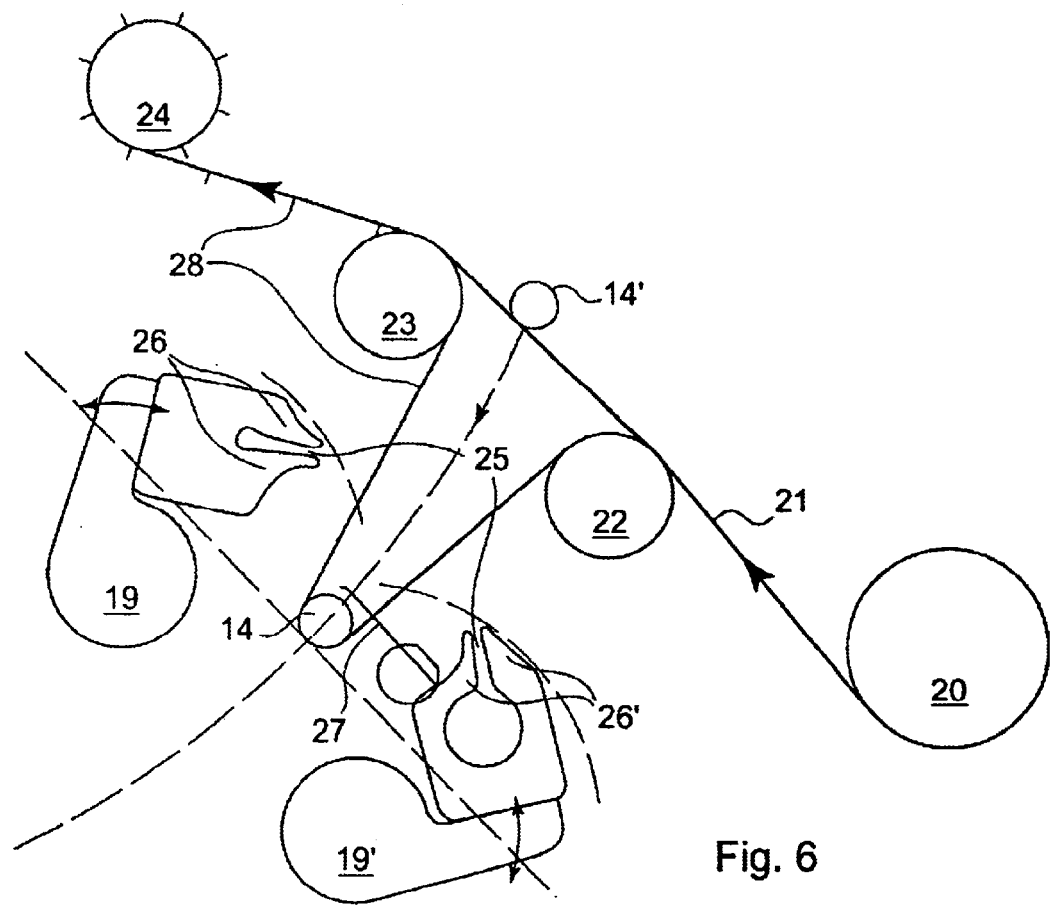
FIG. 6 shows the supply of a strip of film round a mandrel for producing a side seam.
Figure 7:
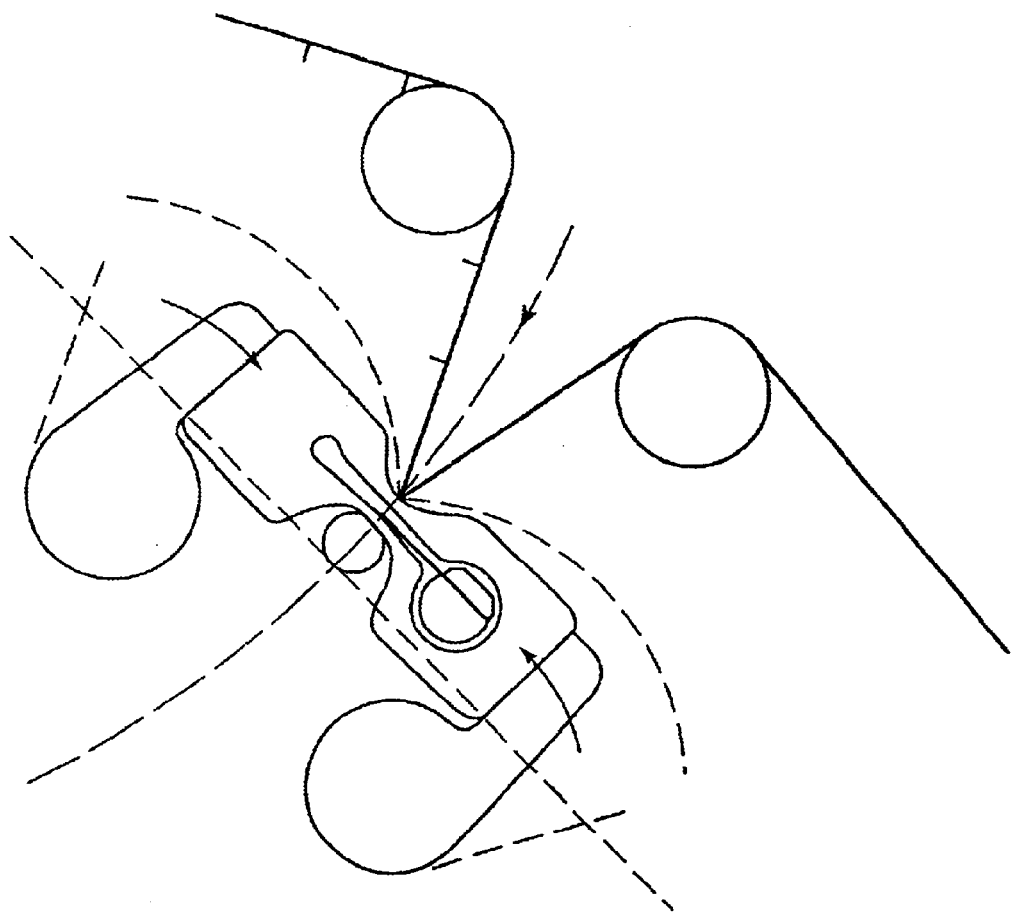
FIG. 7 shows the formation of a side seam on a film wound round a mandrel and its separation from the strip of film.

FIGS. 6 and 7 show schematically the production of a tube. The production process illustrated is suitable in particular for very thin films, for example 75 micrometers (0.075 millimeters) thick. Such a strip of film 21 arranged on a roller 20 is guided over two rotatable fixed deflecting rollers 22, 23 and the start of the strip is wound onto a spool 24. A mandrel 14 or 15, arranged on a turntable, for example, can be inserted between the two deflection rollers 22, 23 in such a way that it deflects the strip of film 21 (see FIG. 6) and is partially covered by it. In a certain position of the mandrel 14 and 15 with the deflected strip of film 21, the two welding jaws 19 pivot inwards and, have a shape which is such that the mandrel 14, 15 is completely covered by the strip of film 21. Each welding jaw 19, 19' has jaw projections 26 which are separated, i.e. provided with a gap 25. The shape of the jaw projections 26 is chosen such that the strip of film 21 covers the respective mandrel 14 or 15 completely and lies with two lateral edges parallel to one another, which lateral edges project perpendicular to the mandrel surface. A side seam 17' of the adjacent lateral edges of the strip of film 21 is welded and formed by the welding jaws 19, 19' lying opposite one another. The side seam 17' formed between the opposing welding jaws 19, 19' is divided by means of a knife 27 which can be introduced into the gap 25 between the jaw projections 26 and 26' which are spaced apart from one another, in such a way that one portion produces the side seam itself and one portion remains connected to the strip of film 21 and can be wound on the spool 24.

In the embodiment shown, in the inwardly pivoted state of the welding jaws 19, 19', the retaining device for the knife 27 can be introduced into a guide in one of the welding jaws 19, 191 and can be moved up and down in the gap 25 of both welding jaws 19, 19', the previously welded side seam 17' being divided, as described above.

When the welding jaws 19, 19' are pivoted away from the mandrel 14, 15 the mandrel 14, 15 now provided with a tube 11, 12 can be transported to the next workstation. The connected strip of film 21 can be clamped between the deflecting rollers 22, 23 (dashed line in FIG. 6) with the separated side seam portions 28 by the drive of the spool 24. A further portion of the strip of film 21 is unwound from the spool 20, which portion is then looped again—as described above—by the mandrel 14' (FIG. 6) that follows on the turntable for example, and can be provided with a side weld seam 17'. By dividing the side seam 17' formed a continuous strip remains which can be gradually wound onto the spool 24 and partially consists of the fresh strip of film 21 and partially of a portion of strip which has been divided up and comprises the side seam portions 28.

The advantage of this solution lies in the fact that despite the side seam 17' being cut by the knife 27 there is always a continuous strip which can be guided with a controllable tension by pulling (spool 24) and optionally with additional deceleration of the spool 20.

The corresponding welding devices and film guides can be arranged at different heights to produce the inner tube and the outer tube, can be height adjustable and/or optionally arranged so as to also be axially displaceable or pivotable.

With sufficient rigidity, for example in a stronger, thicker film, winding round a mandrel can also take place in that an overlapping seam (not shown) can be provided which can be produced so as to be bonded, for example by applying an adhesive or a double-sided adhesive strip, or welded, for which purpose suitable supply and adhesion or welding devices and optionally cutting devices as well would have to be provided, which are all so familiar to a person skilled in the art that they do not need to be described in more detail here.

What is claimed is:

1. Device for producing the two-chamber containers, with an inner mandrel (15) and an outer mandrel (14), wherein the inner mandrel (15) can be inserted into and withdrawn from the outer mandrel (14), a die cavity for the cap (3) and a material feeder for supplying a heated portion of a thermoplastic polymer material into the die cavity (18) of a compression mould, characterised in that it has a device for winding a film round the driven-out inner mandrel (15) and a device for winding a film round the outer mandrel (14) and advanceable welding devices to produce longitudinal side seams (17) to produce tubs (11, 12), wherein the mandrels (14, 15) can both be inserted into and withdrawn from the die cavity (18) of the compression mould to produce a cap (3) with seal (8) and for connection to the walls of the chambers (1, 2) formed, and in that each mandrel (14, 15) has a projection ($16_1$, $16_2$) in the direction of the die cavity (18) for forming a channel ($7_1$ or $7_2$) in the cap (3) connected to a chamber (1 or 2) in each case.

2. Device according to claim 1, characterised in that the advanceable welding device has two opposing and pivotable welding jaws (19, 19') which have two jaw projections (26, 26') separated by a gap (25) in each case, wherein a cutting device (27) can be inserted into a withdrawn from the common gap (25).

* * * * *